May 10, 1966  E. P. ARTHUR  3,250,688
ELECTROCHEMICAL TRANSDUCER AND METHOD OF USING THE SAME
Filed Feb. 20, 1963  2 Sheets-Sheet 2

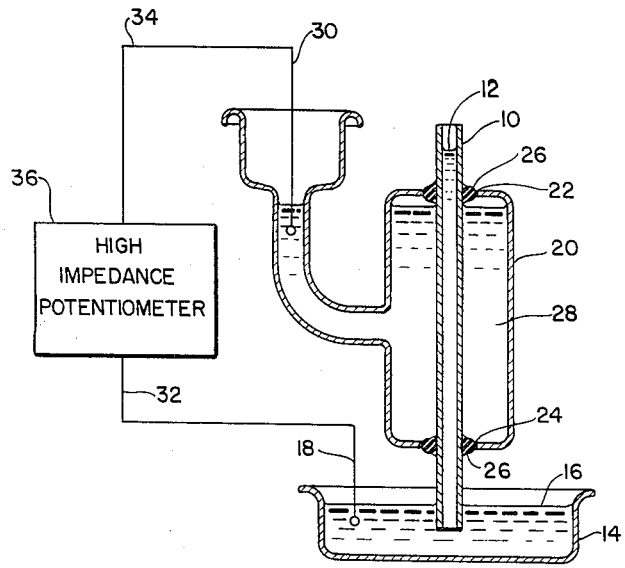
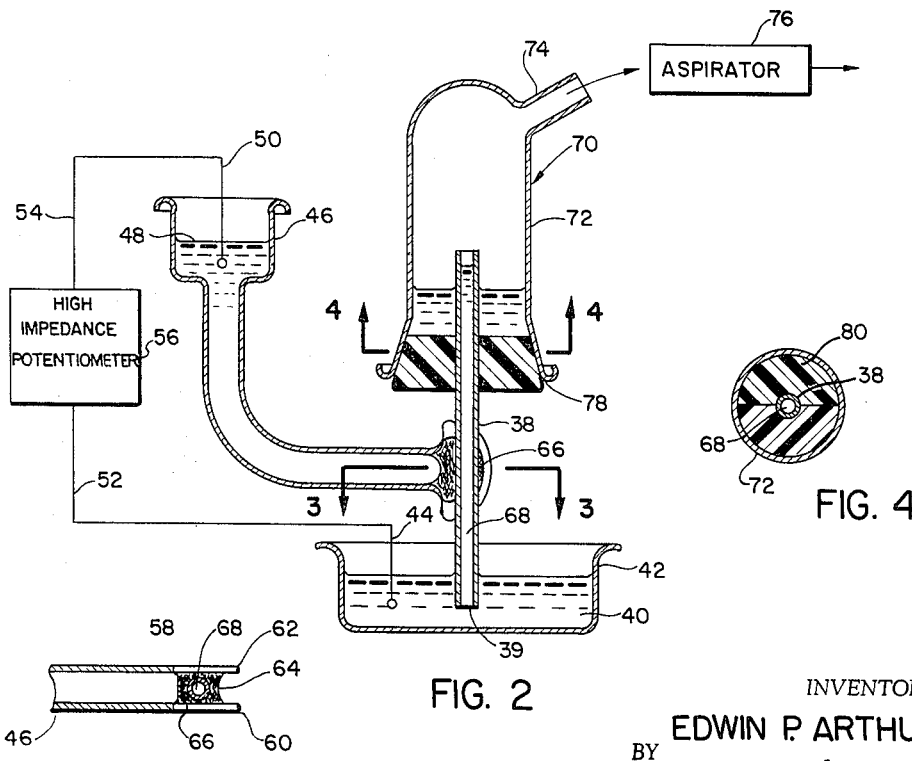

INVENTOR.
EDWIN P. ARTHUR
BY Thomas L. Peterson
ATTORNEY

United States Patent Office 3,250,688
Patented May 10, 1966

3,250,688
ELECTROCHEMICAL TRANSDUCER AND
METHOD OF USING THE SAME
Edwin P. Arthur, Fullerton, Calif., assignor to Beckman
Instruments, Inc., a corporation of California
Filed Feb. 20, 1963, Ser. No. 259,928
15 Claims. (Cl. 204—1)

This invention relates to an electrochemical transducer and, in particular, to an electrochemical transducer for evaluating ionic concentration of very small samples.

On frequent occasions, the necessity arises for measuring the ionic concentration of very small samples of fluids, sometimes referred to as micro-samples. When it is desired to analyze the ionic concentration of a blood sample or other body fluid, sometimes only very small samples may be taken from subjects such as mice, for example. Thus, a means must be provided for holding a very small sample so that it may be most advantageously analyzed. Also, there is a growing requirement for analyzing many small samples or the like within a minimum amount of time and at minimum expense.

One electrochemical transducer arrangement has heretofore been devised for the purpose of meeting the above-mentioned requirements. In such arrangement, a conventional capillary tube is used which is formed of an electrochemically sensitive glass. A sample such as blood is drawn into the tube by surface tension or capillary forces. The tube is then vertically positioned with its lower end disposed in a salt bridge fluid reservoir which also receives a conventional reference half-cell, as is normally used in the measurement of electrochemical potentials involving two separate electrodes. A buffered electrolyte reservoir is then provided having aligned openings in its upper and lower portions. The capillary sample tube is inserted through the openings and sealed to the reservoir by means of wax or other thermoplastic material. The electrolyte reservoir is then filled with a salt solution and an indicator half-cell is inserted in the reservoir and connected to the reference half-cell by a conventional high impedance potentiometer. By this arrangement, the high impedance potentiometer connecting the two half-cells provides a measure of the potential developed at the transducer interface which is a function of the ionic concentration in the sample solution in the capillary tube.

The above arrangement has several important disadvantages. One disadvantage is that too often the surface tension or capillary action of the capillary tube is insufficient to permit the loading of the tube with a sample fluid. Also, even when the capillary tube is adequately filled with a sample, the capillary action of the tube is insufficient for rinsing or washing the sample out of the tube and reusing it. Thus the tubes have been discarded after initial use as cleaning is so difficult. Another problem is that the tubes are extremely fragile; the handling required for sealing the tubes by wax to a suitable chamber repeatedly results in the tubes being broken. Another disadvantage of the conventional arrangement is that the sealing of the capillary tube in such a chamber is extremely time consuming.

What is needed, therefore, and constitutes the principal object of the present invention, is a means for quickly and inexpensively analyzing small samples of fluids.

Another object of the invention is to provide an electrochemical transducer apparatus for analyzing very small samples utilizing a sample tube which may be quickly assembled within the apparatus and withdrawn therefrom.

A further object of the invention is to provide an electrochemical transducer apparatus for measuring small samples utilizing a sample tube and means associated therewith for alternately drawing a sample into the tube and rinsing or washing samples from the tube.

According to the principal aspect of the present invention, the reservoir containing a buffered electrolyte fluid and indicator half-cell is positioned entirely outside of the sample tube and is spaced therefrom rather than surrounding the tube. The reservoir has an open end for contacting a buffered electrolyte gel on the outer surface of the sample tube. The gel has sufficient viscosity to adhere to the sample tube without flowing from the tube. The gel completes an electrochemical train between the sample in the tube and, via the buffered electrolyte fluid, the indicator half-cell. Also, the outer surface of the sample tube is provided with a hydrophobic zone between the gel and the reference salt bridge fluid to eliminate an alternate electrolytic path which would result in loss in potential. By this arrangement, the buffered electrolyte reservoir containing the indicator half-cell and the sample tube may be quickly brought into contact to determine the ionic concentration of the sample without any assembly of the sample tube inside a chamber and sealing it thereto by means of wax or the like.

According to another aspect of the invention, there is provided a means for drawing a sample into the sample tube of the above-described arrangement and for withdrawing the sample from the tube and, thereafter, flowing a rinsing or washing solution therethrough for the purpose of cleansing the tube so that it may again receive an additional sample to be analyzed. Still a further aspect of the invention is to provide a sample tube which is adapted to be connected to a syringe or other aspirator device for drawing a sample therein and which may be quickly and easily positioned in a transducer apparatus wherein a salt bridge gel contacts the external portion of the sample tube and provides an electrolytic path to an indicator half-cell. By this arrangement, the sample may be quickly analyzed and the sample tube cleared, washed and rinsed without removal from the assembly and then either retired to shelf storage or held ready for immediate reuse.

Other objects, aspects and advantages will become apparent from the following description taken in connection with the accompanying drawings wherein:

FIG. 1 is a cross-sectional view of a conventional electrochemical transducer utilizing a capillary tube;

FIG. 2 is a cross-sectional view through the electrochemical transducer apparatus of the present invention showing the parts thicker than in actual use for purpose of clarity;

FIG. 3 is a sectional view taken along line 3—3 of FIG. 2 showing the reservoir for the salt bridge gel;

FIG. 4 is a sectional view taken along line 4—4 of FIG. 2 showing the details of the split stopper construction;

Figure 5:
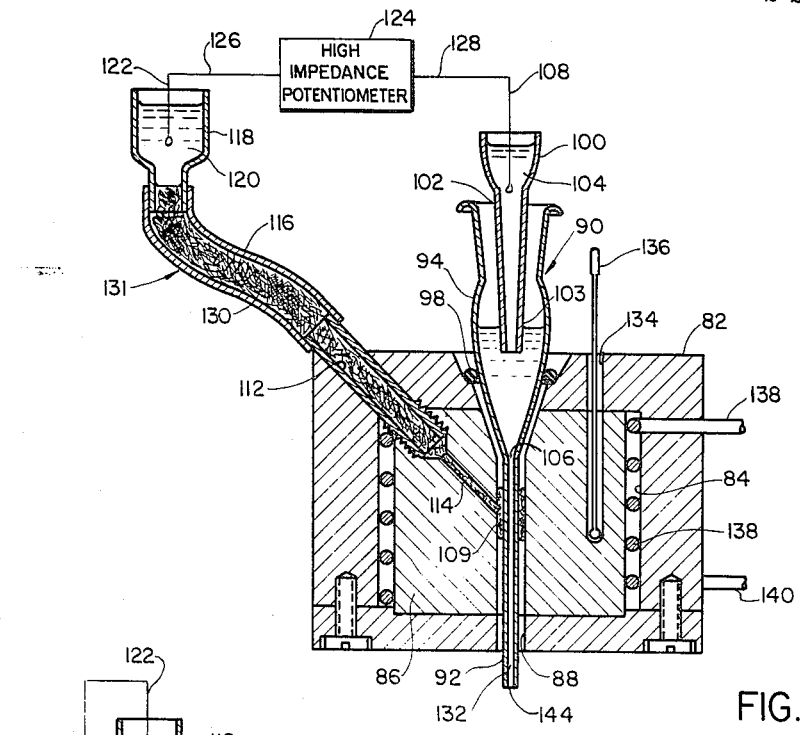
FIG. 5 shows a cross-sectional view through the apparatus of a modification of the invention shown in FIG. 2.

Referring now to FIG. 1 of the drawings, there is shown a capillary transducer apparatus of the type presently in use for handling small samples. As described above, this apparatus includes a capillary tube 10 which receives a sample 12 such as blood or another body fluid by means of surface tension or capillary forces. However, in practice these forces are frequently insufficient to draw a sample into the tube. The bottom of the tube is positioned in a salt bridge fluid reservoir 14 containing a solution such as potassium chloride 16; a reference half-cell 18 contacts the salt bridge fluid. The capillary tube 10 is assembled in a chamber 20 having openings in the top and bottom thereof, 22 and 24, respectively. The tube is held fast in the chamber by means of wax or other thermoplastic material 26. The chamber 20 is filled with a buffered electrolyte 28 which is contacted by an indicator half-cell 30. The two half-cells 18 and 30 are connected by leads 32 and 34 to a conventional high impedance potentiometer 36. As in conventional concentration measurements, ions in the sample being analyzed accumulate a potential at the surface of the electrochemically sensitive glass of the capillary tube 10. This potential is then evaluated by the potentiometer 36. The assembling and disassembling of the capillary tube 10 in the chamber 20 is time consuming and more often than not results in the breaking of the fragile capillary tube due to the delicate handling required to make such an assembly.

Referring now to FIGS. 2 to 4 which show one embodiment of the present invention, a sample tube 38 is provided which need not be an extremely small capillary tube because separate means are provided for drawing a sample therethrough independent of surface tension. As in the device shown in FIGURE 1, the sample tube 38 has its lower open end 39 contacting a salt bridge fluid such as potassium chloride 40 in a reservoir 42. A reference half-cell 44 such as silver coated with silver chloride also contacts the salt bridge fluid 40. Another reservoir 46 containing a buffered electrolyte 48, receives an indicator half-cell 50 which may be of similar construction as the half-cell 44. The two half-cells 44 and 50 are connected, respectively, through leads 52 and 54 to a high impedance potentiometer 56.

The reservoir 46 differs in construction from the chamber 20 in FIG. 1 in that the lower end thereof has an opening 58 and is bifurcated to provide walls 60 and 62 which are adapted to be positioned on either side of the sample tube 38 and are spaced from the tube. The space between the walls 60 and 62 and the outer surface of the sample tube 38 defines a reservoir 64 for receiving a buffered electrolyte gel 66. This gel should be of sufficiently high viscosity so that it will remain in its position against the walls of a sample tube without additional means for retaining the gel. However, the reservoir 64 provided by walls 60 and 62 serves to partially retain the gel 66 against the sample tube 38 and, thereby, ensure that the gel is maintained against the sample tube for a sufficient time to perform tests on multiple samples. An example of a suitable buffered electrolyte gel is hydrated methyl cellulose or agar-agar gel in a dilute alkali phosphate solution. The gel 66 and electrolyte 48 in reservoir 46 complete an electrolytic train from the sample 68, via the ion sensitive glass of tube 38 and the indicator half-cell 50. The potential developed at the sample tube wall is evaluated by the high impedance potentiometer 56 and provides a measure of the ionic concentration in the sample. By this arrangement, the salt bridge fluid reservoir 64 containing the electrolyte gel 66 may be merely brought up into contact with the sample tube 38 and withdrawn from the tube once a measurement has been made. There is no requirement for securely attaching the sample tube 38 to the reservoir 46 nor for filling and refilling the reservoir with electrolyte as is required in the device shown in FIG. 1.

It is essential that the outer surface of the sample tube 38 be provided with a hydrophobic zone between the gel 66 and the salt bridge fluid 40. This may be accomplished by treating the outer surface of the sample tube with a hydrophobic silane solution such as the organosilicon product, Desicote, marketed by Beckman Instruments, Inc., An alternative means of providing a hydrophobic zone is by applying a hot wax or paraffin bead around the lower portion of the sample tube to isolate it into two zones. By so treating the outer surface of the sample tube, the sorbed water is removed from the surface of the glass tube thereby eliminating any alternate electrolytic path to cause any loss in potential. This provides a greater accuracy of measurement of the ion concentration and without fluctuations of such measurements, due to film effects on the sample tube.

An additional feature of the invention is to provide a means for drawing a sample into the sample tube 38 and for withdrawing the sample from the tube after a measurement has been made, and, thereafter, for rinsing the sample from the tube. To this end, there is provided an overflow reservoir, generally indicated by numeral 70, which comprises an inverted tube 72 having a port 74 which is adapted to be connected to an aspirator 76. The upper portion of the sample tube 38 is connected to the lower open end 78 of the tube 72 by means of a split rubber or plastic stopper 80. It can be appreciated that the sample tube can be assembled to the overflow reservoir by merely placing the two elements of the split stopper 80 on either side of the sample tube and, thereafter, urging the lower portion of the overflow reservoir onto the outer surface of the split stopper 80. By this arrangement, there is no necessity for forcing the fragile sample tube through a conventional rubber stopper or resorting to the time consuming method of assembling the tube in a chamber by means of wax, etc. The upper portion of the stopper 80 is positioned somewhat below the upper end of the sample tube 38 to provide a space for the overflow of fluids drawn through the sample tube by means of the aspirator 76.

In operation of this device, the sample tube 38 is filled initially with buffers and a sample may be drawn by means of capillary forces if the tube be of sufficiently small diameter or it may be filled with an aspirator 76. Once a measurement has been made by the potentiometer 56, the salt bridge fluid reservoir 42 is removed from the bottom portion of the sample tube 38 and the aspirator activated to withdraw the sample from the tube out through port 74. Thereafter, a beaker of rinsing or washing solutions, not shown, is positioned in contact with the lower end of the sample tube and the aspirator operated to draw the solution through the tube to completely clean any sample therefrom. Next, the cleansing solution beaker is withdrawn and a second blood sample or the like is brought into contact with the lower end of the sample tube 38 and again the sample is drawn into the tube by the aspirator 76. Thus, it can be appreciated that the sample tube may be reused many times by this arrangement and while assembled in the apparatus. However, if the overflow reservoir 70 and aspirator 76 is not used, the sample tube 38 may merely be brought into contact with the salt bridge gel 66 between the walls 60 and 62 of the salt bridge fluid reservoir 46 and supported there by any suitable means. It is understood that the salt bridge fluid reservoir 46 and overflow reservoir assembly 70 are maintained in their desired position by means of any type of suitable supporting stand, not shown.

Figure 6:
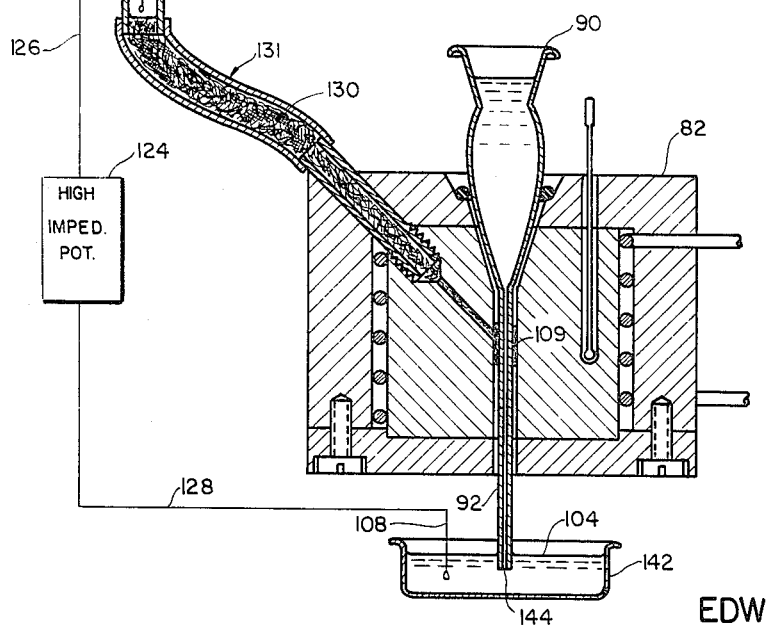
FIG. 6 shows a cross-sectional view of still a further modification of the present invention.

Referring now to FIGS. 5 and 6 of the drawings, wherein like reference characters designate like or corresponding parts throughout the two views, there are shown additional embodiments of the invention which are most suitable for providing a very quick analysis of a small sample. As seen in FIGURE 5, there is provided a housing 82 having a chamber 84 which receives a heatsink metal or ceramic block 86. The housing 82 and block 86 have a vertical opening 88 extending therethrough which receives a sample holder, generally referred to by numeral 90. The sample holder is formed of an ion sensitive glass and includes a reduced diameter sample tube 92, which may be a capillary tube if desired, and an integral enlarged upper portion 94. An O-ring 98 lying on the upper portion of the opening 88 in housing 82 serves to position the sample holder 90 in the housing and insulate it from the housing.

A chamber 100 is positioned above the sample holder 90 and includes an extension 102 having a lower open end 103 positioned within the enlarged portion 94 of the sample holder. Chamber 100 contains a salt bridge solution 104 which partially fills the chamber, completely fills the extension 102 and makes electrolytic contact with sample at the top of the reduced diameter portion 92 of the sample holder. Thus, the chamber 100 and the enlarged portion of holder 90 constitutes a salt bridge reservoir and the entire body of salt solution therein provides a salt bridge between the sample in the open end 106 of the reduced diameter sample tube 92 and a reference half-cell 108 immersed in the solution 104 at the top of the chamber 100.

As seen in FIG. 5 of the drawings, the cross-sectional area of the sample tube 92 is less than the area of the opening 88 so that the tube is spaced from the walls of the opening and provides an annular reservoir 109. A sleeve 110 having a passage 112 therethrough extends through a portion of the housing 82 and partly into the block 86. A second passage 114 provides communication between the annular reservoir 109 and passage 112. A flexible hose 116 is connected at one end to the free end of the sleeve 110 and at its other end to a second chamber 118 containing a buffered electrolyte 120. An indicator half-cell 122 is immersed in the electrolyte 120 and is connected to a high impedance potentiometer 124 by a lead 126. The other side of the potentiometer is connected by lead 128 to the reference half-cell 108.

A buffered electrolyte gel 130 of the same type as gel 66 shown in FIG. 2 fills a portion of the annular reservoir 109, all of passages 112 and 114, and the flexible hose 116. Chamber 118, hose 116 and passages 112 and 114 together provide an electrolyte fluid reservoir, generally referred to by numeral 131. The electrolyte 120 and gel in the fluid reservoir 131 thus provide an electrolytic path between the gel in reservoir 109 and the indicator half-cell 122. As in the previous embodiment of the invention, the ions in the sample 132 in sample tube 92 develop a potential at the electrochemically sensitive glass walls of the tube. The gel surrounding the tube complete the train to the indicator half-cell 122 and the potential is evaluated by the potentiometer 124. As in the embodiment shown in FIG. 2, the outer surface of the sample tube 92 or sample holder 90 between the gel 109 and the salt bridge fluid 104 in the holder must be treated to provide a hydrophobic isolating zone. The flexible tube 116 provides a useful feature in that if small portions of the gel in reservoir 109 drip down the opening 88 in the housing 82, the supply of the gel may be replenished by simply compressing the flexible hose to force additional gel to be delivered to the reservoir 109.

If desired, a chamber 134 may be provided in the housing 82 and in block 86 for receiving a thermometer 136. A high resistance heating coil 138 may be wound about the heat-sink block 86 and leads 138 and 140 connected to the coil and extending through the housing 82 are provided and are adapted to be connected to a suitable power source, not shown, for heating the coil. Thus, there is provided a means for heating the block 86 to maintain the sample 132 at any predetermined temperature as, for example, maintaining a sample of blood at body temperature. The thermometer 136 provides a measure of the temperature within the block.

In this embodiment of the invention, a sample may be drawn into the sample holder 90 by connecting the holder 90 to a syringe or aspirator device. The sample holder is readily inserted into the opening 88 in the housing 82 and by compressing the hose 116, a suitable amount of electrolyte gel is supplied to the reservoir 109. Next, the lower end of chamber 100 is inserted into the enlarged portion 94 of the sample holder 90 and the salt bridge solution 104 in the chamber is permitted to flow slightly into the sample holder to provide an electrolytic path between the sample 88 and the reference half-cell 108. The ionic concentration of the sample is then determined by the reading of the potentiometer 124. After a reading is made, the chamber 108 may be removed from the sample holder 90 and the sample holder removed from the assembly to be cleaned for reuse.

A slightly different version of the arrangement in FIG. 5 is illustrated in FIG. 6 wherein, instead of inserting the chamber containing the reference half-cell through the top of the sample holder 90, a reference salt bridge fluid reservoir 142 is provided below the housing 82. This reservoir contains the salt bridge fluid 104 in which there is immersed the reference half-cell 108. The lower open end 144 of the sample holder 90 is received by the salt bridge fluid reservoir 142 and the solution 104 provides an electrolytic path between the sample within the sample holder 90 and the reference half-cell 108. As in the device shown in FIG. 2 the sample tube between the gel 109 and salt bridge fluid 104 is treated to provide a hydrophobic zone to prevent an electrolytic path between the gel and salt bridge solution. In all other respects, this embodiment of the invention is similar to that shown in FIG. 5.

Although several embodiments of the invention have been disclosed herein for purposes of illustration, it will be understood that various changes can be made in the form, details, arrangement and proportions of the various parts in such embodiments without departing from the spirit and scope of the invention as defined by the following claims.

What is claimed is:

1. An electrochemical transducer comprising:
   a sample tube formed of ion sensitive glass and having an opening at each end thereof;
   a salt bridge fluid reservoir;
   a reference half-cell in said salt bridge fluid reservoir;
   said sample tube having one end thereof in said salt bridge fluid reservoir;
   an indicator half-cell outside of said sample tube;
   a buffered electrolyte fluid reservoir receiving said indicator half-cell and having an open end adjacent said sample tube and spaced therefrom, said electrolyte fluid reservoir and said sample tube being readily detachable from each other;
   a buffered electrolyte gel contacting the outer surface of said sample tube and said open end of said buffered electrolyte fluid reservoir to electrolytically join said sample tube and said buffered electrolyte fluid reservoir; and
   the outer surface of said sample tube having a hydrophobic zone between said electrolyte gel and said salt bridge fluid reservoir.

2. An electrochemical transducer as set forth in claim 1 wherein said sample tube is a capillary tube.

3. An electrochemical transducer comprising:
   a sample tube formed of ion sensitive glass and having an opening at each end thereof;
   a salt bridge fluid reservoir;
   a reference half-cell in said salt bridge fluid reservoir;
   said sample tube having one end thereof in said salt bridge fluid reservoir;
   an indicator half-cell outside of said sample tube;
   a buffered electrolyte fluid reservoir receiving said indicator half-cell and having an open end adjacent said sample tube;
   means at least partially surrounding a portion of said sample tube and spaced therefrom along the entire extent of said portion of said sample tube to provide a third reservoir, and said means and said sample tube being readily detachable from each other;
   said open end of said buffered electrolyte fluid reservoir communicating with said third reservoir;
   a buffered electrolyte gel in said third reservoir contacting the outer surface of said sample tube and said open end of said buffered electrolyte fluid reservoir to electrolytically join said sample tube and said buffered electrolyte fluid reservoir; and the outer surface of said sample tube having a hydrophobic zone between said third reservoir and said salt bridge fluid reservoir.

4. An electrochemical transducer comprising:
a sample tub formed of ion sensitive glass and having an opening at each end thereof;
a salt bridge fluid reservoir;
a reference half-cell in said salt bridge fluid reservoir;
said sample tube having one end thereof in said salt bridge fluid reservoir;
an indicator half-cell outside of said sample tube;
a tubular chamber for containing a buffered electrolyte fluid receiving said indicator half-cell;
said tubular chamber having an opening at one end thereof adjacent said sample tube and the walls of said tubular chamber at said one end being bifurcated to partially surround a portion of said sample tube, said bifurcated walls being spaced from said sample tube to provide a third reservoir, a buffered electrolyte gel in said third reservoir contacting the outer surface of said sample tube, and said bifurcated walls and said sample tube being readily detachable from each other; and
the outer surface of said sample tube having a hydrophobic zone between said third reservoir and said salt bridge fluid reservoir.

5. An electrochemical transducer as set forth in claim 3 wherein said means completely surrounds said portion of said sample tube.

6. An electrochemical transducer comprising:
an upright sample tube formed of ion sensitive glass and having an opening at each end thereof;
a salt bridge fluid reservoir;
a reference half-cell in said salt bridge fluid reservoir;
said sample tube having its lower end in said salt bridge fluid reservoir;
an indicator half-cell outside of said sample tube;
a buffered electrotype fluid reservoir receiving said indicator half-cell and having an open end adjacent said sample tube;
means at least partially surrounding a portion of said sample tube and spaced therefrom along the entire extent to said portion of said sample tube to provide a third reservoir, a buffered electrolyte gel in said third reservoir contacting the outer surface of said sample tube, and said means and said sample tube being readily detachable from each other;
said open end of said buffered electrolyte fluid reservoir communicating with said third reservoir;
the outer surface of said sample tube having a hydrophobic zone between said third reservoir and said salt bridge fluid reservoir;
an overflow reservoir enclosing the upper portion of said sample tube and the bottom of said overflow reservoir being disposed below the upper end of said sample tube; and
a port on said overflow reservoir adapted to be connected to an aspirator device.

7. An electrochemical transducer as set forth in claim 6 wherein said overflow reservoir comprises a tube closed at its upper end and open at its lower end; and
a longitudinally split stopper connecting said lower end of said overflow reservoir to said sample tube.

8. An electrochemical transducer comprising:
an element having an opening therein;
a sample tube formed of ion sensitive glass and having an opening at each end thereof and being disposed in said opening in said element;
said sample tube being spaced from the walls of said opening in said element to provide a first reservoir and said sample tube and said element being readily detachable from each other;
a salt bridge fluid reservoir;
a reference half-cell in said salt bridge fluid reservoir;
said sample tube having one end thereof in said salt bridge fluid reservoir;
an indicator helf-cell outside of said sample tube;
a buffered electrolyte fluid reservoir receiving said indicator half-cell and extending through said element to said first reservoir;
a buffered electrolyte gel in said first reservoir contacting the outer surface of said sample tube and said buffered electrolyte fluid reservoir to electrolytically join said sample tube and said buffered electrolyte fluid reservoir; and
the outer surface of said sample tube having a hydrophobic zone between said first reservoir and said salt bridge fluid reservoir.

9. An electrochemical transducer as set forth in claim 8 including means for maintaining the sample tube at a predetermined temperature.

10. An electrochemical transducer as set forth in claim 8 wherein said buffered electrolyte fluid reservoir includes a portion thereof having a flexible wall whereby the electrolyte fluid therein and therefore said gel can be urged, by compressing said flexible wall, toward said first reservoir.

11. An electrochemical transducer as set forth in claim 10 wherein said flexible wall portion of said buffered electrolye fluid reservoir contains buffered electrolyte gel.

12. An electrochemical transducer as set forth in claim 8 and, in addition:
said opening in said element being substantially vertically disposed and extending completely through said element;
said sample tube being of sufficient length so that its lower end extends beyond said opening in said element; and
said salt bridge fluid reservoir receiving said lower end of said sample tube.

13. An electrochemical transducer comprising:
an element having a substantially vertically disposed opening therein;
a sample holder formed of ion sensitive glass and having an opening at each end thereof and being disposed in said opening in said element;
said sample holder including a reduced diameter sample tube and an enlarged portion adapted to receive a salt bridge fluid;
a salt bridge fluid reservoir disposed above said sample holder and having its lower end extending into said enlarged portion of said sample holder;
a reference half-cell in said salt bridge fluid reservoir;
said sample tube being spaced from the walls of said opening in said element to provide an annular reservoir, a buffered electrolyte gel in said annular reservoir contacting the outer surface of said sample tube, and sample tube and said element being readily detachable from each other;
an indicator half-cell outside of said sample holder;
a buffered electrolyte fluid reservoir receiving said indicator half-cell and extending through said element to said annular reservoir; and
a portion of the outer surface of said sample holder having a hydrophobic zone between said annular reservoir and said salt bridge fluid reservoir.

14. A method of measuring the ion concentration in a liquid sample comprising the steps of:
providing a buffered electrolyte fluid reservoir having an opening therein and an indicator half-cell in the reservoir;
providing a reference half-cell in a salt bridge fluid;
supplying a liquid sample to a sample tube formed of ion sensitive glass and having an opening at each end thereof, said sample tube and said buffered electrolyte fluid reservoir being readily detachable from each other;
applying a buffered electrolyte gel to a portion of the outer surface of said sample tube;

contacting one of the ends of said sample tube with said salt bridge fluid;

contacting the buffered electrolyte gel on said sample tube with said opening in said buffered electrolyte fluid reservoir;

providing a hydrophobic zone on the outer surface of said sample tube between said gel and the salt bridge fluid;

determining the potential developed between the reference half-cell and indicator half-cell as a measure of the ion concentration in the liquid; and thereafter detaching said sample tube and said end of said buffered electrolyte fluid reservoir from each other.

15. An electrochemical transducer comprising:

an element having a substantially vertically disposed opening therethrough;

a sample tube formed of an ion sensitive glass and having an opening at each end thereof, said tube being disposed in said opening in said element;

said sample tube being of sufficient length so that its lower end extends beyond said opening in said element;

a salt bridge fluid reservoir below said element and receiving the lower end of said sample tube;

a reference half-cell in said salt bridge fluid reservoir;

said sample tube being spaced from the walls of said opening in said element to provide an annular reservoir, a buffered electrolyte gel in said third reservoir contacting the outer surface of said sample tube, and said sample tube and said element being readily detachable from each other;

an indicator half-cell outside of said sample tube;

a buffered electrolyte fluid reservoir receiving said indicator half-cell and extending through said element to said annular reservoir; and a portion of the outer surface of said sample tube having a hydrophobic zone between said annular reservoir and said salt bridge fluid reservoir.

References Cited by the Examiner

UNITED STATES PATENTS

| | | | |
|---|---|---|---|
| 1,990,768 | 2/1935 | Youden | 204—195 |
| 2,201,659 | 5/1940 | Young | 204—195 |

FOREIGN PATENTS

| | | |
|---|---|---|
| 750,436 | 5/1944 | Germany. |
| 1,078,348 | 3/1960 | Germany. |

OTHER REFERENCES

Reference Electrode, Ives et al., Academic Press, New York, 1961, page 496.

Science, Sept. 19, 1941, pages 285 and 286.

JOHN H. MACK, *Primary Examiner.*

T. TUNG, *Assistant Examiner.*